(12) United States Patent  (10) Patent No.: US 8,505,364 B2
Batzinger et al.  (45) Date of Patent: Aug. 13, 2013

(54) SYSTEMS AND METHODS FOR USE IN MONITORING OPERATION OF A ROTATING COMPONENT

(75) Inventors: Thomas James Batzinger, Burnt Hills, NY (US); Vivek Venugopal Badami, Niskayuna, NY (US); Wangming Lu, Katy, TX (US); Scott Mordin Hoyte, Fountain Inn, SC (US); Mandar Diwakar Godbole, Karnataka (IN); Ravi Yoganatha Babu, Karnataka (IN); Aninda Bhattacharya, Karnataka (IN); Jacob John Kittleson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 13/289,680

(22) Filed: Nov. 4, 2011

(65) Prior Publication Data

US 2013/0111982 A1 May 9, 2013

(51) Int. Cl.
*G01M 15/14* (2006.01)
(52) U.S. Cl.
USPC ..................................................... 73/112.01
(58) Field of Classification Search
USPC ..................................................... 73/112.01
See application file for complete search history.

(56) References Cited

U.S. PATENT DOCUMENTS

| | | | |
|---|---|---|---|
| 3,908,444 A | 9/1975 | Peter | |
| 4,593,566 A | 6/1986 | Ellis | |
| 5,026,816 A | 6/1991 | Keehan | |
| 5,483,833 A | 1/1996 | Dickens et al. | |
| 5,541,857 A | 7/1996 | Walter et al. | |
| 5,942,690 A | 8/1999 | Shvetsky | |
| 7,696,893 B2 | 4/2010 | Cairo et al. | |
| 2003/0060986 A1 | 3/2003 | Flotow | |
| 2003/0204333 A1 | 10/2003 | Asatsu et al. | |
| 2006/0078193 A1 | 4/2006 | Brummel et al. | |
| 2006/0280604 A1 | 12/2006 | Roney et al. | |
| 2007/0132461 A1 | 6/2007 | Holmquist et al. | |
| 2007/0160457 A1 | 7/2007 | Bilson et al. | |
| 2007/0271023 A1 | 11/2007 | Morris et al. | |
| 2009/0044627 A1* | 2/2009 | Brady | 73/643 |
| 2009/0082976 A1* | 3/2009 | Anuzis et al. | 702/35 |
| 2009/0092491 A1 | 4/2009 | Cairo et al. | |
| 2009/0108830 A1 | 4/2009 | Rose | |
| 2009/0229367 A1 | 9/2009 | Boetius et al. | |
| 2009/0320609 A1 | 12/2009 | Xia et al. | |
| 2009/0322373 A1 | 12/2009 | Dooley | |
| 2010/0089166 A1 | 4/2010 | Zielinski et al. | |
| 2012/0130688 A1* | 5/2012 | Jiang et al. | 703/2 |

FOREIGN PATENT DOCUMENTS

EP 2172761 A1 7/2010

* cited by examiner

*Primary Examiner* — Freddie Kirkland, III
(74) *Attorney, Agent, or Firm* — Fletcher Yoder, P.C.

(57) ABSTRACT

A system for use in monitoring operation of a rotor assembly is provided. The system includes a plurality of clearance sensors including at least a first clearance sensor configured to measure a distance between the first sensor and a surface of a lockwire tab, and a monitoring unit coupled to the plurality of clearance sensors, the monitoring unit configured to receive measurements from the plurality of clearance sensors, and determine whether a crack exists in the rotor assembly based on the received measurements.

20 Claims, 4 Drawing Sheets

SYSTEMS AND METHODS FOR USE IN MONITORING OPERATION OF A ROTATING COMPONENT

BACKGROUND OF THE INVENTION

The subject matter disclosed herein relates generally to monitoring systems and, more specifically, to systems and methods for use in monitoring operation of rotor assemblies.

Known machines, such as gas turbines, include rotor assemblies. The rotor assemblies may exhibit vibrations or other behavior during operation. Sensors may be used to monitor such behavior to determine the operational status of one or more components. For example, sensors may measure an amount of vibration induced in a motor drive shaft, a rotational position or displacement of the motor drive shaft, and/or other operational characteristics of a machine or motor. Often, sensors are coupled to a monitoring system that includes a plurality of monitors and at least one processor. The monitoring system receives signals that are representative of measurements sensed from the sensors.

At least some known monitoring systems use vibration sensors to determine the existence of cracks in a component being monitored. However, because vibration sensors may only be able to detect the existence of a crack, and may be unable to pinpoint the location of a crack, at least some known monitoring systems are unable to accurately determine the location of cracks. Moreover, although at least some known monitoring systems use clearance sensors in an effort to determine the location of cracks, because of temperature limitations of the sensors and space limitations within the machine being monitored, at least some of such monitoring systems are unable to monitor an operating (i.e., online) rotor assembly in a gas turbine engine.

BRIEF DESCRIPTION OF THE INVENTION

In one aspect, a system for use in monitoring operation of a rotor assembly is provided. The system includes a plurality of clearance sensors including at least a first clearance sensor configured to measure a distance between the first sensor and a surface of a lockwire tab, and a monitoring unit coupled to the plurality of clearance sensors, the monitoring unit configured to receive measurements from the plurality of clearance sensors, and determine whether a crack exists in the rotor assembly based on the received measurements.

In another aspect, a monitoring unit for use in monitoring operation of a rotor assembly is provided. The monitoring unit includes a memory device configured to store measurements received from a plurality of clearance sensors that include at least a first sensor configured to measure a distance between the first sensor and a surface of a lockwire tab, and a processing device coupled to the memory device and configured to determine whether a crack exists in the rotor assembly based on the stored measurements.

In yet another aspect, a method for monitoring operation of a rotor assembly is provided. The method includes acquiring, from at least one clearance sensor, measurements indicative of the distance between the at least one clearance sensor and a component of the rotor assembly, wherein the at least one clearance sensor includes a first sensor configured to measure a distance between the first sensor and a surface of a lockwire tab, transmitting the acquired measurements to a monitoring unit, and determining, using the monitoring unit, whether a crack exists in the rotor assembly based on the received measurements.

DETAILED DESCRIPTION OF THE INVENTION

The systems and methods described herein enable cracks in a rotor assembly of a gas turbine to be accurately identified. A plurality of clearance sensors periodically measure distances to a component of the rotor assembly. More specifically, at least one sensor measures a distance between the sensor and a surface of a lockwire tab. Measurement taken by the plurality of clearance sensors are transmitted to a monitoring unit that uses the measurements to determine whether any cracking exists. The monitoring unit may also compare measurements from at least two clearance sensors to determine the location of a crack on the component.

Technical effects of the methods and systems described herein include at least one of: (a) acquiring, from at least one clearance sensor, measurements indicative of the distance between the at least one sensor and a component of the rotor assembly, wherein the at least one clearance sensor includes a first sensor configured to measure a distance between the first sensor and a surface of a lockwire tab; (b) transmitting the acquired measurements to a monitoring unit; and (c) determining whether a crack exists in the rotor assembly based on the received measurements.

Figure 1:
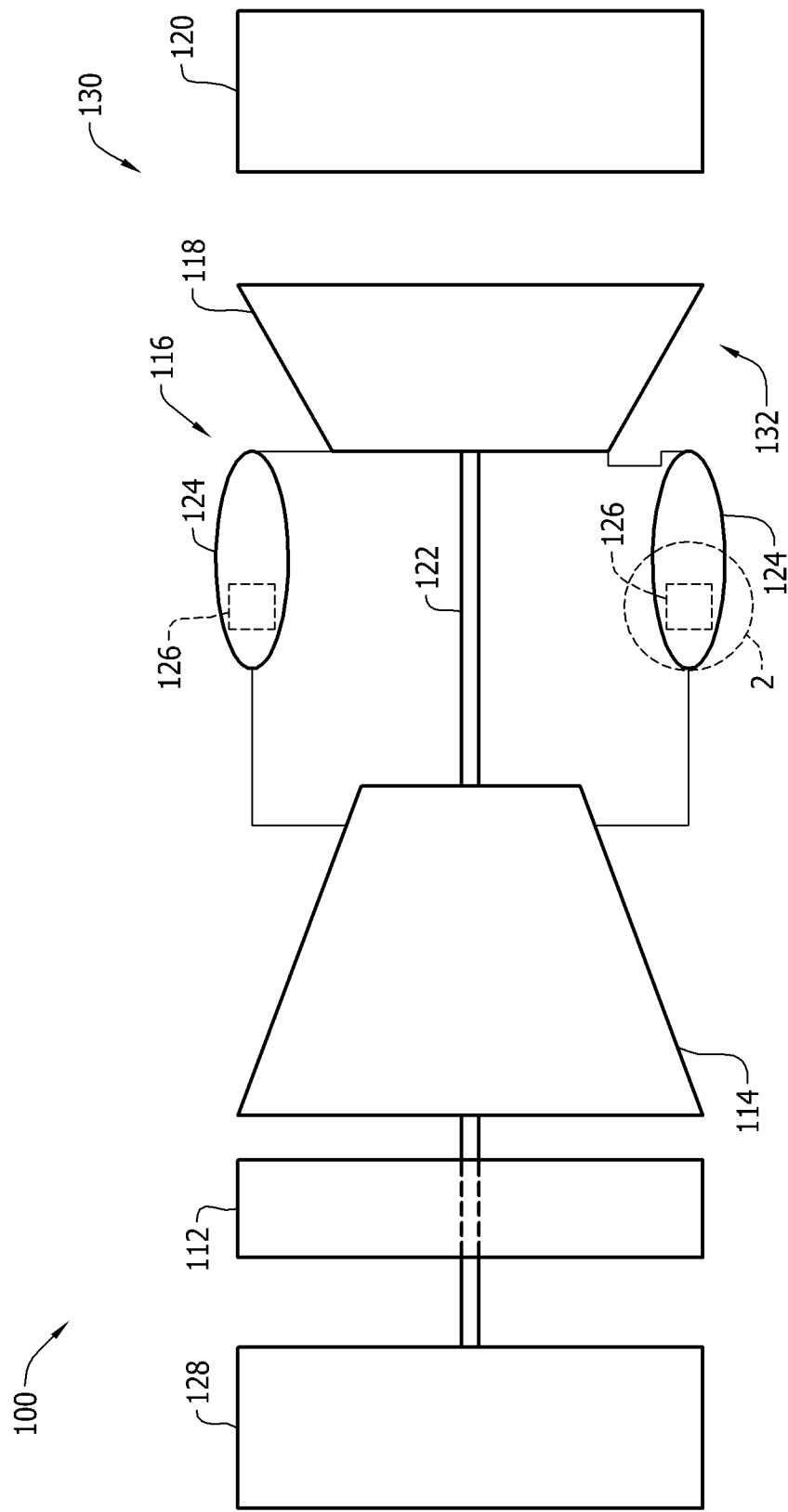
FIG. 1 is a schematic cross-sectional view of an exemplary turbine engine.

FIG. 1 is a schematic cross-sectional view of an exemplary turbine engine 100. More specifically, in the exemplary embodiment, turbine engine 100 is a gas turbine engine. While the exemplary embodiment is directed towards a gas turbine engine, the present invention is not limited to any one particular engine, and one of ordinary skill in the art will appreciate that the current invention may be used in connection with other turbine engines and/or rotating structures other than a rotor assembly.

In the exemplary embodiment, turbine engine 100 includes an intake section 112, a compressor section 114 downstream from intake section 112, a combustor section 116 downstream from compressor section 114, a turbine section 118 downstream from combustor section 116, and an exhaust section 120. In the exemplary embodiment, turbine section 118 is coupled to compressor section 114 via a rotor shaft 122. Alternatively, turbine engine 100 does not include a rotor shaft 102 coupling turbine section 118 to compressor section 114. In the exemplary embodiment, combustor section 116 includes a plurality of combustors 124. Combustor section 116 is coupled to compressor section 114 such that each combustor 124 is in flow communication with compressor section 114. A fuel injection assembly 126 is coupled within each combustor 124. Turbine section 118 is coupled to compressor section 114 and to a load 128 such as, but not limited to, an electrical generator and/or a mechanical drive application. In the exemplary embodiment, each compressor section 114 and turbine section 118 includes at least one rotor disk assembly 130 that is coupled to a rotor shaft 122 to form a rotor assembly 132.

Figure 2:
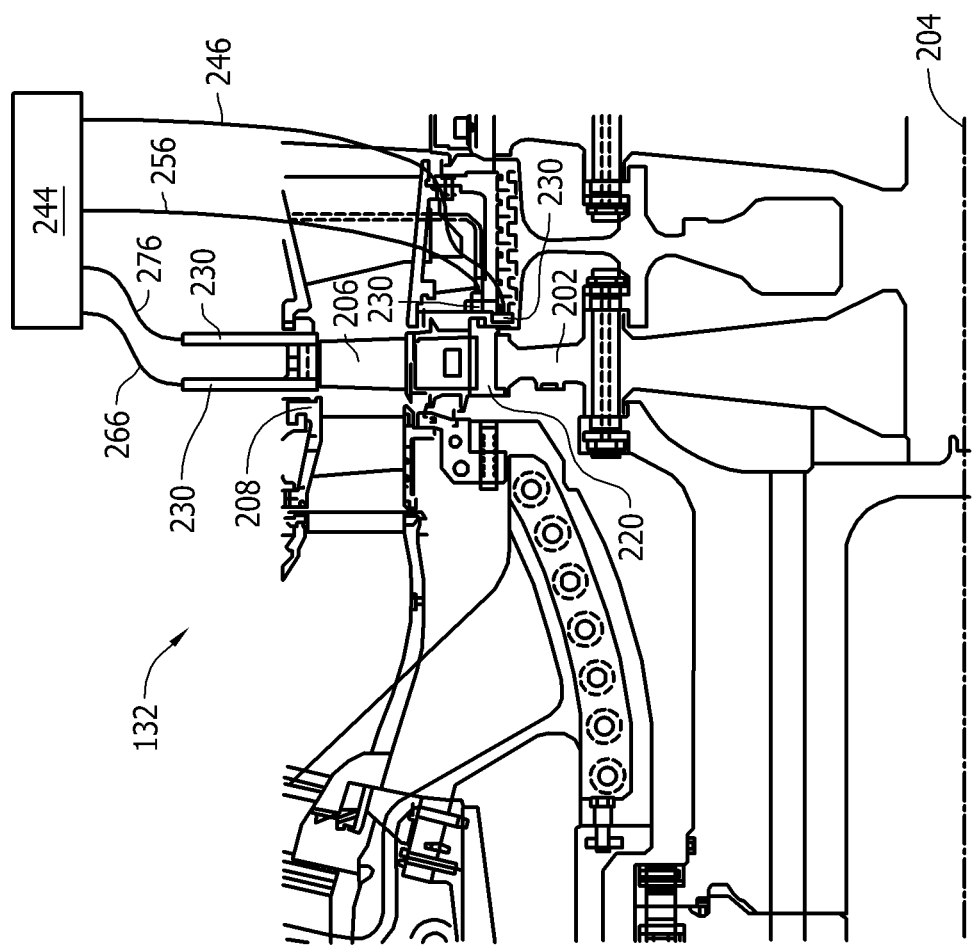
FIG. 2 is a schematic cross-sectional view of an exemplary rotor assembly that may be used with the turbine engine shown in FIG. 1.
Figure 3:
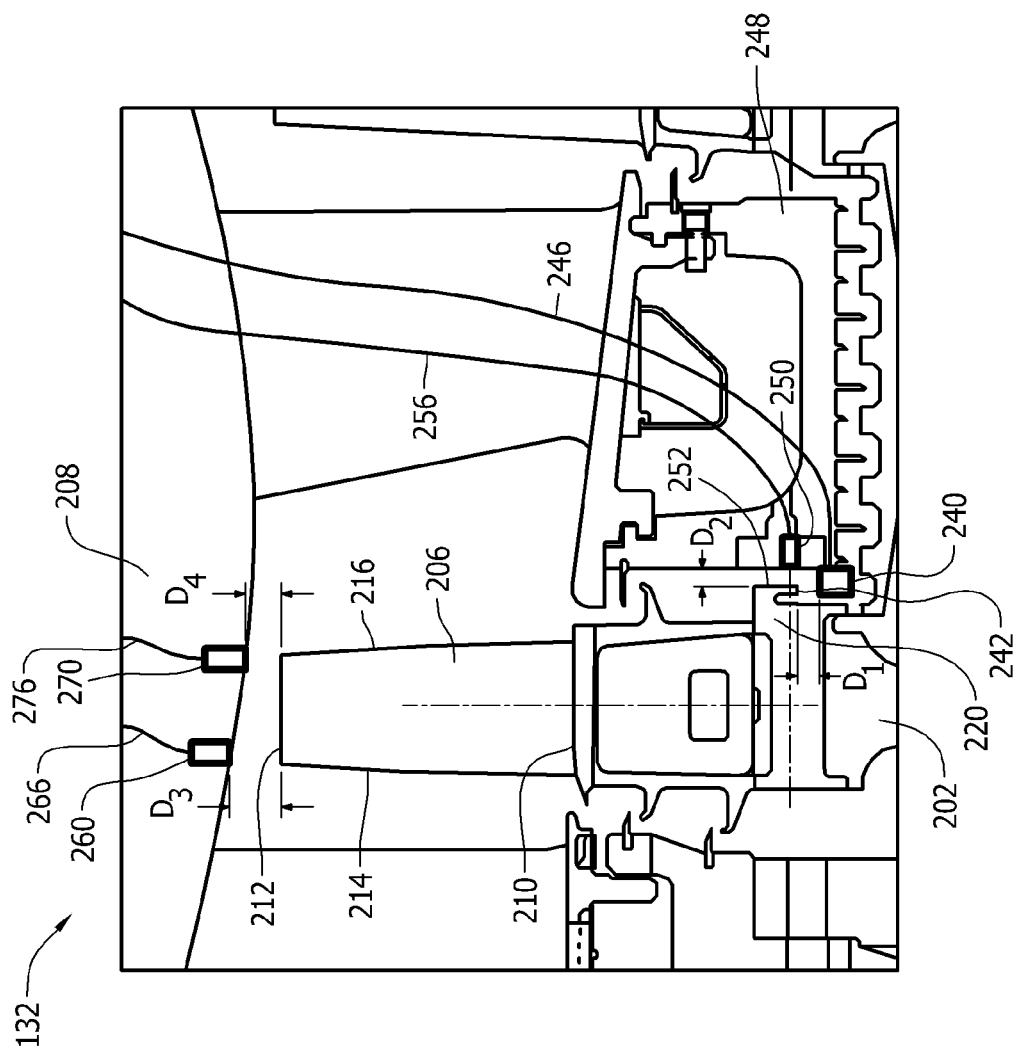
FIG. 3 is an enlarged view of a portion of the rotor assembly shown in FIG. 2.

FIG. 2 is a schematic cross-sectional view of rotor assembly 132 that may be used with turbine engine 100 (shown in FIG. 1). FIG. 3 is an enlarged view of a portion of rotor assembly 132 taken along area 3 (shown in FIG. 2). In the exemplary embodiment, rotor assembly 132 includes a rotor wheel 202 that circumscribes a longitudinal axis 204 extending axially through rotor assembly 132.

A plurality of buckets 206 are coupled to rotor wheel 202 and each extend radially outward from rotor wheel 202 towards an outer casing 208 in a radial direction that is perpendicular to longitudinal axis 204. Moreover, each bucket 206 extends radially from a base 210 to a tip 212, and extends axially from a leading edge 214 to a trailing edge 216. A lockwire tab 220 at base 210 secures an axial position of bucket 206 relative to rotor wheel 202. Although only one bucket 206 is illustrated in FIG. 2, rotor assembly 132 includes a plurality of buckets 206 that are coupled to and that extend radially outward from rotor wheel 202. As such, during operation, rotor wheel 202 and bucket 206 simultaneously rotate about longitudinal axis 204.

Rotor assembly 132 also includes one or more clearance sensors 230 that each monitor a relative position of lockwire tab 220 and/or bucket 206 to enable determining whether any lockwire tabs 220 and/or buckets 206 have developed any cracks, as is described in more detail below.

In the exemplary embodiment, clearance sensors 230 are capacitive probes that have a relatively high temperature tolerance. Accordingly, clearance sensors 230 each measure a distance to a surface of a component based on a detected capacitance. Alternatively, clearance sensors 230 may be any other type of sensor that enables rotor assembly 132 to function as described herein. While in the exemplary embodiment, clearance sensors 230 measure a position and displacement of lockwire tab 220 and/or buckets 206, clearance sensors 230 may measure a position and displacement of any surface and/or feature of any component in rotor assembly 132 that enables rotor assembly 132 to function as described herein. For example, clearance sensors 230 may measure a position and displacement of features proximate base 210 other than lockwire tab 220.

A first sensor 240 of the clearance sensors 230 is positioned to measure a radial position and displacement of lockwire tab 220. Specifically, first sensor 240 measures a radial distance $D_1$ between first sensor 240 and a first surface 242 of lockwire tab 220. First surface 242 is substantially parallel to longitudinal axis 204, and first sensor 240 is coupled to a monitoring unit 244 via a first cable 246. Monitoring unit 244 processes data received from clearance sensors 230, as is described in more detail below. Measurements from first sensor 240 are transmitted to monitoring unit 244 via first cable 246. First cable 246 may also provide power to first sensor 240. In the exemplary embodiment, first sensor 240 is coupled to a diaphragm seal 248, and first cable 246 passes through diaphragm seal 248, a stator vane, and outer casing 208 to reach monitoring unit 244. Alternatively, first sensor 240 and first cable 246 have any relative position and/or orientation that enables rotor assembly 132 to function as described herein.

A second sensor 250 of clearance sensors 230 measures an axial position and displacement of lockwire tab 220. Specifically, second sensor 250 measures an axial distance $D_2$ between second sensor 250 and a second surface 252 of lockwire tab 220. Second sensor 250 is coupled to monitoring unit 244 via a second cable 256. Measurements from second sensor 250 are transmitted to monitoring unit 244 via second cable 256. Second cable 256 may also provide power to second sensor 250. In the exemplary embodiment, second sensor 250 is coupled to diaphragm seal 248, and second cable 256 passes through diaphragm seal 248, a stator vane, and outer casing 208 to reach monitoring unit 244. Alternatively, second sensor 250 and second cable 256 have any relative position and/or orientation that enables rotor assembly 132 to function as described herein.

A third sensor 260 measures a radial position and displacement of tip 212 adjacent to leading edge 214. Specifically, third sensor 260 measures a radial distance $D_3$ defined between third sensor 260 and tip 212. Third sensor 260 is coupled to monitoring unit 244 via a third cable 266. Measurements from third sensor 260 are transmitted to monitoring unit 244 via third cable 266. Third cable 266 may also provide power to third sensor 260. In the exemplary embodiment, third sensor 260 is coupled to outer casing 208, and third cable 266 passes through outer casing 208. Alternatively, third sensor 260 and third cable 266 have any relative position and/or orientation that enables rotor assembly 132 to function as described herein.

A fourth sensor 270 measures a radial position and displacement of tip 212 adjacent to trailing edge 216. Specifically, fourth sensor 270 measures a radial distance $D_4$ between fourth sensor 270 and tip 212. Fourth sensor 270 is coupled to monitoring unit 244 via a fourth cable 276. Measurements from fourth sensor 270 are transmitted to monitoring unit 244 via fourth cable 276. Fourth cable 276 may also provide power to fourth sensor 270. In the exemplary embodiment, fourth sensor 270 is coupled to outer casing 208, and fourth cable 276 passes through outer casing 208. Alternatively, fourth sensor 270 and fourth cable 276 have any relative position and/or orientation that enables rotor assembly 132 to function as described herein.

In the exemplary embodiment, as first and second surfaces 242 and 252 are substantially continuous as rotor assembly 132 rotates, first and second sensors 240 and 250 are amplitude modulated capacitive probes. In amplitude modulated capacitive probes, the output voltage of the capacitive probe increases as the clearance increases. On the other hand, due to space between adjacent buckets 206, surface of tip 212 is discontinuous as measured by third and fourth sensors 260 and 270 while rotor assembly 132 rotates. Accordingly, the in the exemplary embodiment, third and fourth sensors 260 and 270 are frequency modulated capacitive probes. In frequency modulated capacitive probes, the output voltage of the capacitive probe decreases as the clearance increases. Amplitude modulated and frequency modulated capacitive probes may be calibrated using any methods that enable clearance sensors 230 to function as described herein.

While the exemplary embodiment includes four clearance sensors 230, rotor assembly 132 may include any number of clearance sensors 230 that enables rotor assembly 132 to function as described herein. In the exemplary embodiment, clearance sensors 230 periodically measure the position and displacement of bucket 206. Alternatively, clearance sensors 230 may continuously measure the position and displacement of bucket 206. Further, while in the exemplary embodiment, clearance sensors 230 relay measurements to monitoring unit 244 via cables 246, 256, 266, and 276, alternatively, clearance sensors 230 may wirelessly transmit measurements to monitoring unit.

Figure 4:
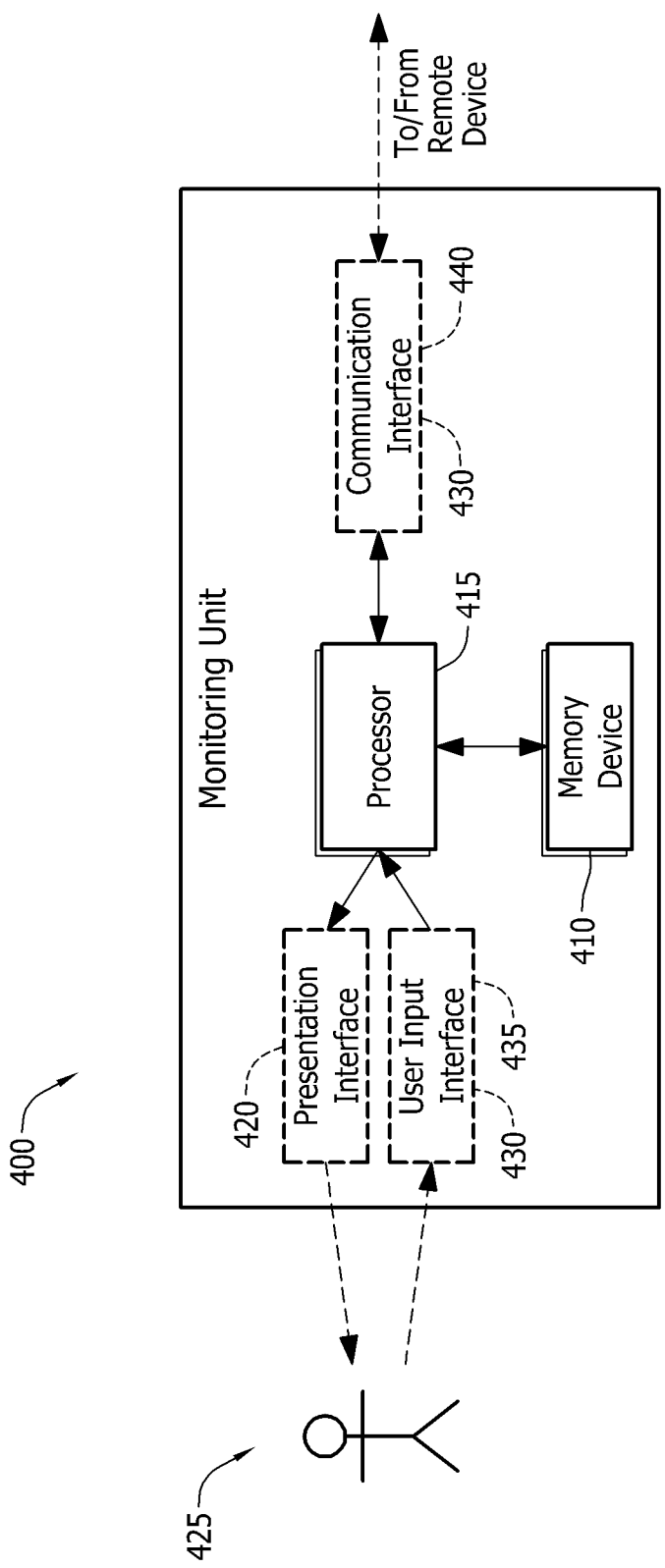
FIG. 4 is a block diagram of an exemplary monitoring unit that may be used with the rotor assembly shown in FIG. 2.

FIG. 4 is a block diagram of an exemplary monitoring unit 400, such as monitoring unit 244 (shown in FIG. 2), that may be used to monitor rotor assembly 132 (shown in FIG. 2) for cracking. Monitoring unit 400 includes at least one memory device 410 and a processor 415 that is coupled to memory device 410 for executing instructions. In some embodiments, executable instructions are stored in memory device 410. Monitoring unit 400 performs one or more operations described herein by programming processor 415. For example, processor 415 may be programmed by encoding an operation as one or more executable instructions and by providing the executable instructions in memory device 410. Processor 415 may include one or more processing units (e.g., in a multi-core configuration).

Memory device 410 is one or more devices that enable information such as executable instructions and/or other data to be stored and retrieved. Memory device 410 may include one or more computer readable media, such as, without limitation, dynamic random access memory (DRAM), static random access memory (SRAM), a solid state disk, and/or a hard disk. Memory device 410 may be configured to store, without limitation, application source code, application object code, source code portions of interest, object code portions of interest, configuration data, execution events and/or any other type of data.

In some embodiments, monitoring unit 400 includes a presentation interface 420 that is coupled to processor 415. Presentation interface 420 presents information, such as application source code and/or execution events, to a user 425. For example, presentation interface 420 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 420 includes one or more display devices.

In some embodiments, monitoring unit 400 includes an input interface 430, such as a user input interface 435. In the exemplary embodiment, user input interface 435 is coupled to processor 415 and receives input from user 425. User input interface 435 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 420 and user input interface 435.

In the exemplary embodiment, monitoring unit 400 includes a communication interface 440 coupled to processor 415. Communication interface 440 communicates with one or more remote devices. In the exemplary embodiment, communication interface 440 communicates with clearance sensors 230. To communicate with remote devices, communication interface 440 may include, for example, a wired network adapter, a wireless network adapter, and/or a mobile telecommunications adapter.

Measurements from clearances sensors 230 are received by monitoring unit 244 and stored in memory device 410. To determine whether cracks exist in bucket 206, processor 415 analyzes and processes measurements stored in memory device 410. In the exemplary embodiment, processor 415 analyzes measurements for each clearance sensor 230 over time. Alternatively, processor 415 analyzes measurements in any manner that facilitates detecting cracks in bucket 206.

In the exemplary embodiment, processor 415 monitors measurements for each clearance sensor 230 individually. For example, processor 415 may monitor distance $D_1$ over time as measured by first sensor 240. If processor 415 determines that distance $D_1$ is increasing over time, such a trend may indicate that lockwire tab first surface 242 is pulling away from first sensor 240, and accordingly, that a crack may be developing and/or have developed in lockwire tab 220. Similarly, if processor 415 determines that distance $D_1$ is decreasing over time, a crack may be developing and/or have developed in lockwire tab 220. Accordingly, measurements from a single clearance sensor 230 may be used to determine the existence and/or location of a crack.

In the exemplary embodiment, processor 415 also compares measurements received from a plurality of sensors 230 to determine the location of a potential crack. Specifically, based on the received measurements, processor 415 may determine the axial location of a crack (i.e., whether the crack is proximate leading edge 214 or trailing edge 216) as well as the radial location of the crack (i.e., whether the crack is in lockwire tab 220 or bucket 206). For example, processor may compare data measured by third sensor 260 with data measured by fourth sensor 270. If, for example, distance $D_3$ increases over time while distance $D_4$ decreases over time, such data may indicate that bucket 206 is shifting or tipping towards leading edge 214, and there is a likelihood that a crack may have developed along bucket trailing edge 216. Similarly, if distance $D_3$ decreases over time while distance $D_4$ increases over time, it is probable that a crack may have developed along bucket leading edge 214. In yet another example, if distances $D_3$ and $D_4$ change over time, but distances $D_1$ and $D_2$ remain constant, it is probable that a crack may have developed in bucket 206, but not in lockwire tab 220.

Accordingly, by analyzing measurements from clearance sensors 230, processor 415 can determine the existence of a crack in bucket 206 and/or lockwire tab 220, as well as an approximate location of the crack. That is, processor 415 can monitor and/or compare measurements for any number of clearance sensors 230 to determine the existence and/or location of a crack. For example, processor 415 may compare measurements between first sensor 240 and second sensor 250 to determine the location of a crack within lockwire tab 220. Moreover, other data related to rotor assembly 132, such as pressure, temperature, and/or vibration data may be combined with the measurements from clearance sensors 230 for further analysis.

In some embodiments, a baseline clearance for each clearance sensor 230 is stored in memory device 410. Further, each clearance sensor 230 may have a distinct baseline clearance for each of a plurality of operating regimes. The operating regimes may be characterized by operating parameters such as, for example, power produced, a fuel stroke ratio, a turbine speed, an inlet guide vane angle, and an estimated firing temperature. Such operating parameters may be monitored and stored to determine the applicable operating regime. When measurements from a given clearance sensor 230 deviate from the associated baseline measurement, processor 415 may establish a corresponding threat level. For example, in one embodiment, processor 415 may generate a minor "watch" threat level when measurements deviate from the baseline by three or more standard deviations, a moderate "warn" threat level when measurements deviate by four-and-a-half or more standard deviations, and a major "alert" threat level when measurements deviate by six or more standard deviations. Thresholds for the threat levels may also be determined by finite element modeling and/or observation of rotor assembly 132. Appropriate alerts may be generated by processor 415 based on the threat level. Further, alerts from multiple sensors 230 may be combined to generate a composite alert for rotor assembly 132.

In the exemplary embodiment, when processor 415 detects a crack in bucket 206 by analyzing measurements from clearance sensors 230 using one or more of the methods described herein, processor 415 generates an alert to notify an operator of the possibility of a crack. The alert may include any audio and/or visual indication that notifies user 425 of existence and/or location of a crack. For example, the alert may include at least one of a sound generated by presentation interface 420 and/or an icon, symbol, and/or message displayed on presentation interface 420. The alert may also be an electronic alert (e.g., a text message) sent to a mobile device.

Processor 415 may also be used to detect anomalies other than cracks in rotor assembly 132 by analyzing measurements from clearance sensors 230. For example, by analyzing measurements from first and/or second sensors 240 and 250, processor 415 may determine that lockwire tab 220 is failing and/or that a lockwire of lockwire tab 220 has slipped. Similar to above, when processor 415 detects failure of one or more components of lockwire tab 220, processor 415 may generate a corresponding alert. An operator who receives the alert can take appropriate action to prevent damage to rotor assembly 132.

The embodiments described herein enable cracks in a rotor assembly of a gas turbine to be accurately identified. A plurality of clearance sensors periodically measure distances to a component of the rotor assembly. More specifically, at least one sensor measures a distance between the sensor and a surface of a lockwire tab. Measurement taken by the plurality of clearance sensors are transmitted to a monitoring unit that uses the measurements to determine whether any cracking exists. The monitoring unit may also compare measurements from at least two clearance sensors to determine the location of a crack on the component.

As compared to at least some known monitoring systems, the monitoring systems described herein enable cracks to be identified in a rotor assembly while the rotor assembly is in operation (i.e., online). Moreover, at least some known monitoring systems are able to determine the existence of a crack, but not the location of the crack. In contrast, the embodiments described herein enable determination of an existence and a location of a crack. Furthermore, unlike at least some known monitoring systems that measure only blade clearance, the monitoring systems described herein also accurately measure clearances of a lockwire tab.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other systems, apparatus, and methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in terms of various specific embodiments, those skilled in the art will recognize that the invention may be practiced with modification within the spirit and scope of the claims.

What is claimed is:

1. A system for use in monitoring operation of a rotor assembly, said system comprising:
   a plurality of clearance sensors comprising at least a first clearance sensor configured to measure a distance between said first sensor and a surface of a lockwire tab; and
   a monitoring unit coupled to said plurality of clearance sensors, said monitoring unit configured to:
   receive measurements from said plurality of clearance sensors; and
   determine whether a crack exists in the rotor assembly based on the received measurements.

2. A system in accordance with claim 1, wherein said first sensor comprises a sensor positioned to measure a distance between said first sensor and a surface of the lockwire tab that is substantially parallel to a longitudinal axis of the rotor assembly.

3. A system in accordance with claim 1, wherein said first sensor comprises a sensor positioned to measure a distance between said sensor and a surface of the lockwire tab that is substantially perpendicular to a longitudinal axis of the rotor assembly.

4. A system in accordance with claim 1, wherein said plurality of clearance sensors further comprises at least a second sensor positioned to measure a distance between said second sensor and a surface of a bucket coupled to the rotor assembly.

5. A system in accordance with claim 4, wherein said second sensor comprises a sensor positioned to measure a distance between said second sensor and a tip of the bucket adjacent to a leading edge of the bucket.

6. A system in accordance with claim 4, wherein said second sensor comprises a sensor positioned to measure a distance between said second sensor and a tip of the bucket adjacent to a trailing edge of the bucket.

7. A system in accordance with claim 1, wherein said monitoring unit is further configured to compare measurements from at least one of said plurality of clearance sensors to determine a location of a crack in the rotor assembly.

8. A system in accordance with claim 1, wherein said monitoring unit is configured to generate an alert when a crack is detected.

9. A monitoring unit for use in monitoring operation of a rotor assembly, said monitoring unit comprising:
   a memory device configured to store measurements received from a plurality of clearance sensors that include at least a first sensor configured to measure a distance between the first sensor and a surface of a lockwire tab; and
   a processing device coupled to said memory device and configured to determine whether a crack exists in the rotor assembly based on the stored measurements.

10. A monitoring unit in accordance with claim 9, wherein said memory device is configured to store measurements from a first sensor positioned to measure a distance between the first sensor and a surface of the lockwire tab that is substantially parallel to a longitudinal axis of the rotor assembly.

11. A monitoring unit in accordance with claim 9, wherein said memory device is configured to store measurements from a first sensor positioned to measure a distance between the first sensor and a surface of the lockwire tab that is substantially perpendicular to a longitudinal axis of the rotor assembly.

12. A monitoring unit in accordance with claim 9, wherein said memory device is configured to store measurements from a second sensor positioned to measure a distance between the second sensor and a surface of a bucket coupled to the rotor assembly.

13. A monitoring unit in accordance with claim 12, wherein said memory device is configured to store measurements indicative of a distance between the second sensor and a tip of the bucket adjacent to a leading edge of the bucket.

14. A monitoring unit in accordance with claim 12, wherein said memory device is configured to store measurements indicative of a distance between the second sensor and a tip of the bucket adjacent to a trailing edge of the bucket.

15. A monitoring unit in accordance with claim 9, wherein said processing device is further configured to compare measurements from at least one of the plurality of clearance sensors to determine a location of a crack in the rotor assembly.

16. A monitoring unit in accordance with claim 9, wherein said processing device is configured to generate an alert when a crack is detected.

17. A method for monitoring operation of a rotor assembly, said method comprising:
acquiring, from at least one clearance sensor, measurements indicative of the distance between the at least one clearance sensor and a component of the rotor assembly, wherein the at least one clearance sensor includes a first sensor configured to measure a distance between the first sensor and a surface of a lockwire tab;
transmitting the acquired measurements to a monitoring unit; and
determining, using the monitoring unit, whether a crack exists in the rotor assembly based on the received measurements.

18. A method in accordance with claim 17, wherein acquiring measurements comprises acquiring a measurement indicative of a distance between the first sensor and a surface of a lockwire tab that is substantially parallel to a longitudinal axis of the rotor assembly.

19. A method in accordance with claim 17, wherein acquiring measurements comprises acquiring a measurement indicative of a distance between the first sensor and a surface of a lockwire tab that is substantially perpendicular to a longitudinal axis of the rotor assembly.

20. A method in accordance with claim 17, further comprising comparing, using the monitoring device, measurements from at least one clearance sensors to determine a location of a crack.

* * * * *